Figure 1:
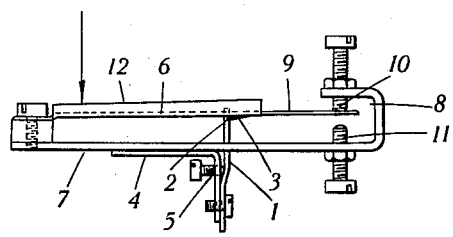

April 23, 1940. H. C. TURNER ET AL 2,198,428

SNAP ACTION MECHANISM

Filed Nov. 4, 1937

INVENTOR
Henry C. Turner
BY and Arthur Sherwin
M. H. Lockwood
ATTORNEY

Patented Apr. 23, 1940

2,198,428

UNITED STATES PATENT OFFICE 2,198,428

SNAP ACTION MECHANISM

Henry Cobden Turner, Manchester, and Arthur Sherwin, Blackley, Manchester, England, assignors to Salford Electrical Instruments Limited, Salford, England Application November 4, 1937, Serial No. 172,678
In Great Britain November 5, 1936

8 Claims. (Cl. 74—100)

This invention relates to snap action mechanism for operating electric switches, valves or like devices and more particularly to snap action mechanism adapted to be operated by small movement of an operating member. An object of the invention is to provide a mechanism suitable for operation by thermally sensitive means such as the known tube and rod type means in which the relative movement between the free ends of the tube and rod may be very small.

According to the invention a snap action mechanism for operating electric switches, valves or like devices comprises a substantially rigid member supported at one end by a flexible or pivotal mounting and connected at the other end by a flexible or pivotal connection to a second substantially rigid member carrying a contact, valve or the like, said connection being intermediate between the ends of said second member, and biasing means arranged to exert a force through a second flexible or pivotal connection on the inner end of said second member, said force acting substantially in the plane through said mounting and the first said connection whereby the first connection is placed under tension so as to impart a snap action to the movement of the said second member.

By "substantially rigid" we mean not perfectly rigid but more in the form of a stiff spring which admits of lateral deflections under lateral pressure.

Preferably the force exerted by said biasing means is adjustable and said second connection comprises a knife-edge type bearing.

Suitable stops are provided for limiting the movement of the moving portions of said second member, one or each of which stops may comprise a contact, valve seating or like means cooperating with said contact, valve or the like carried by said second member.

The two said members may be formed as a one-piece construction comprising a resilient metal blade, a hole being stamped out of the blade near one end thereof so as to provide two portions connected by two flexible portions between the widest part of the hole and the edge of the blade; one or both portions is or are then channelled to impart a suitable degree of rigidity to them. The hole stamped is so shaped that a relatively small tongue extends towards the longer of the two portions, and the channelling of the shorter portion, if this is necessary, preferably comprises one or more longitudinal indentations extending into this tongue; the tongue and shorter portion together form the "second substantially rigid member" above referred to. The channelling of the longer portion may be effected by turning a narrow strip at each edge thereof at a large angle, preferably a right angle, to the plane of the blade; this portion forms the "first substantially rigid member" referred to.

The mechanism may be operated by pressure applied to the said first or second members or by movement of the said biasing means relative to the support.

Figure 2:
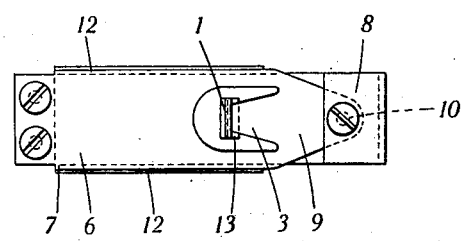

One form of snap action mechanism embodying the invention will now be described by way of example with reference to the accompanying drawing, of which Figure 1 shows a side elevation, and Figure 2 a plan of the mechanism.

This mechanism is of the one-piece construction described above and the biasing means comprises a stout leaf spring 1 supported at one end substantially at right angles to the blade with its free end extending through a hole 13 in the base 7 into the hole in the blade. A slot 2 is cut in this leaf spring 1 parallel to the blade and is arranged to engage the end of the tongue 3 formed in the blade 6 to form a knife edge type bearing. The leaf spring will best be secured at one end to an angle bracket 4 rigidly fixed to a base plate carrying the said blade which is clamped thereto at one end. A screw 5 is arranged in the bracket to act on the leaf spring 1 at a point between its point of fixing and the said slot so that the pressure exerted on the tongue portion of the second member may be varied by screwing this screw into or out of the bracket. This pressure is exerted substantially in the plane of the blade 6. Part 12 of this blade is channelled as shown and acts as the first member or lever. The base plate 7 is provided with an overhang portion 8 overhanging the free end of a second substantially rigid member or lever 9 and this portion may act as a stop, or may carry (as shown) a stop 10, for limiting the movement of the free end of this member 9. A suitable stop 11 is provided on the base plate for limiting the movement of the end of the member 9 in the opposite direction. The free end of this member 9 may carry a contact, valve, or the like and one or each of the said stops may comprise a second contact, a seating for the valve, or the like cooperating member. If they comprise contacts, one or both will need to be insulated from the base.

In use the base plate may be fixed and an operating member may be arranged to act on the blade near its fixed end, for instance along the line indicated by the arrow in Figure 1 so as to press the blade towards the base to cause the contact member (or valve or like member) to move from one limiting position to another. It will be seen that what is termed the "first" member 12 acts here as a substantially rigid multiplying device or lever; that is, it multiplies the movement of the operating member to an extent depending upon the position of the point of contact of the operating member with the first member. The nearer this point is to the fixed end of the blade, the greater the multiplication. If the length of the first member is increased, so is the multiplication. If the limiting means are adjustable as shown, it may be arranged that the gap between them is short or long as required. If the gap is long then the contact member will usually not be returned to the non-operated position when the operating pressure is removed except by application of pressure in the opposite direction. This may be remedied if desired by arranging (as here shown) that when this contact member is in one limiting position, the knife-edge connection between the spring means and the tongue 3 of the second member 9 is slightly removed from the plane through the fixed end of the blade and the flexible connection between the two members formed by the blade; or alternatively spring means may return the contact member to its non-operated position and it may conveniently be arranged that the flexibility of the connection between the two members and/or between blade and the base plate is sufficient. When the gap is short the flexibility need not be very great and copper strip of as low as 30 gauge may be used.

It will be seen that the flexible connection between the second lever member 9 and the first lever member 12 is positioned such that in fulcruming on spring 1 by tongue 3, there is effected a multiplication of movement upon the end of the first lever 12.

It will be seen that the springy articulation between the first member 12 and the second member 9 in effect makes these two members a continuous springy member which is supported at one end for rotation, the other end being freely movable. The resilient tongue 3 is directed substantially along the length of this springy member. The leaf spring 1 which forms the fulcrum for the tongue 3 provides a reaction, not only for snapping the tongue 3 over dead-center with respect to the reaction line between the support of part 12 and its connection with part 9, but also provides a support so that when pressure is brought to bear upon the component member 12 (as shown by the arrow in Fig. 1) the bending of component member 12 (as a beam between supports) tends to rotate the other component member 9 upwardly. In any event, the spring 1 prevents incipient downward motion from incipiently drawing the free end of component member 9 away from the stop 10. Such downward motion is delayed until the snap action occurs. Snap action occurs by reason of the downward bowing of the component member 12 until the fulcrum at 2 is overcentered.

Movement of the blade relatively to the base plate may be achieved in a number of ways other than that described. Thus the base plate may be movable and a fixed stop may be provided near the point at which the blade is attached to the base plate so that in effect when the base plate is moved towards the fixed stop the blade is pressed towards the base plate and the contact or the like is actuated. Again a second blade member may be arranged parallel to and above the blade, this second blade having a depending part adapted to engage the tongue; if the base is fixed an operating member is adapted to press at some part of the second blade to depress the tongue, or the operating member may be fixed and the base movable. In this latter construction the nearer the fixed end of the second blade the operating member is arranged, the greater is the movement of the free end for the same movement of the operating member relatively to the base plate.

Other modifications will be apparent to those skilled in the art.

In an alternative construction the one-piece blade is mounted on a resilient bracket fixed to a base plate and the tongue is engaged by a rigid bearing. In this construction a screw threaded member is adapted to screw through the resilient bracket on to a fixed part of the base plate and thereby to increase the pressure of the end of the tongue on its rigid bearing. The operation of this construction is similar to that of the construction described above.

Various modifications in the arrangements above described may be made without departing from the spirit of the invention and the operating mechanism may be adapted to perform different functions from those set forth.

It may be arranged for example that the operating mechanism actuates two or more contacts for multipole working. When the mechanism is used in an electric switch, contacts may be arranged on either side of the contact carrier so that in both limiting positions of the carrier electrical contact is made. Here the limiting means will have to be suitably insulated from each other.

It is to be understood that the invention is applicable to other devices than switches; it may be applied to gas valves and may be arranged for this purpose to act in conjunction with a thermostat to cut off the supply of gas to apparatus in accordance with a predetermined rise in temperature.

The mechanism in accordance with the invention may be used in conjunction with thermostats in electrical devices, such as irons and the like domestic appliances for controlling the supply of energy to the device. It may be arranged for example that the mechanism operates an indicating or warning device when a thermostat in such a device operates, on the device attaining a predetermined temperature.

We have found that in the form of mechanism embodying the one piece construction above described, the moving contact-carrying member may be arranged to move only on one side of the dead centre position without losing the snap action in making and breaking contact. This arrangement is particularly applicable when the mechanism is associated with a thermostat.

We claim:
1. A snap-action mechanism comprising a substantially rigid member supported at one end by a flexible or pivotal mounting and connected at the other end by a flexible or pivotal connection to a second substantially rigid member, said connection being intermediate between the ends of said second member, and biasing means arranged to exert a force through a second flexible or pivotal connection on the inner end of said second member, said force acting substantially in the plane through said mounting and the first said connection whereby the first connection is placed under tension so as to impart a snap action to the movement of the said second member.

2. A snap-action mechanism comprising, a first member supported at one end for angular movement, a second member having a movable connection thereto, the connection being intermediate the ends of the second member to provide an inner end thereon adjacent the first member, the first and second members being springingly articulated, and biasing means connected to the inner end of the second member and arranged to exert a force against the second member substantially along a line between said support for the first member and the connection for the second member.

3. A snap-action mechanism comprising, a first member supported at one end for angular movement, a second member having a connection thereto, the connection being intermediate the ends of the second member, the two members being formed as a single resilient blade having a hole therethrough to provide flexible portions forming the stated connection, the hole being shaped also to form the inner end of the second member, and biasing means connected to the inner end, the biasing means being arranged to exert a force on the inner end substantially in the plane of the blade.

4. A snap-action mechanism comprising a substantially rigid member supported at one end for angular movement and connected to a second substantially rigid member, the connection being intermediate the ends of the second member, whereby an inner end is formed on the second member, and biasing means connected for relative angular movement with the inner end of the second member, the biasing means being arranged to exert a force on the inner end substantially along the line on the first-named rigid member between its support and connection.

5. A snap-action mechanism comprising a blade supported at one end for angular movement and having an extension for free movement at its outer end, the blade being shaped to form an intermediate tongue, and an angling connection between the tongue and the remainder of the blade, the tongue being directed substantially along the length of the blade, means for biasing the tongue with a force substantially along its length, the tongue being attached to said extension to effect multiplied movement of the same with respect to an initial application of movement to the blade.

6. A snap-action mechanism comprising a blade supported at one end for angular movement and having an extension for free movement at its outer end, the blade being shaped to form an intermediate tongue, and an angling connection between the tongue and the remainder of the blade, the tongue being directed substantially along the length of the blade, means for biasing the tongue with a force substantially along its length, the tongue being related to the extension to effect multiplied movement thereof, the biasing means comprising a spring located laterally to that of the blade, and an angling connection between the leaf spring and the tongue.

7. A snap-action mechanism comprising a continuous springy member supported at one end for rotation, the other end being freely movable, a resilient tongue extending from said member and located at a substantial distance from both of its ends and directed substantially along its length, and a resilient fulcrum for the tongue formed to provide a reaction for bending the springy member when the springy member is laterally pressed between its support and the fulcrum whereby the free end of the springy member is forced oppositely against a stop, said fulcrum also pressing the tongue substantially along its length whereby the free end of the springy member is moved from its stop with snap-action after a predetermined bending of the springy member to over-center the tongue.

8. A snap-action mechanism comprising a first lever member supported at one end for angular movement and having a free end, means providing a fulcrum between the supported end of said lever member and its free end, and a second lever member springingly attached between its ends to the end of the first lever member, the second lever member having a tongue portion adapted angularly to cooperate with the fulcrum and directed to assume a sprung position on either side of the line joining the support for the first lever member and the virtual center of articulation between both lever members, the second lever member having a free end opposite its fulcrumed end.

HENRY COBDEN TURNER.
ARTHUR SHERWIN.